Sept. 16, 1958 V. RAWLS 2,852,073
METHOD AND APPARATUS FOR BUFFING TIRE CASINGS
Filed Dec. 15, 1954 5 Sheets-Sheet 5

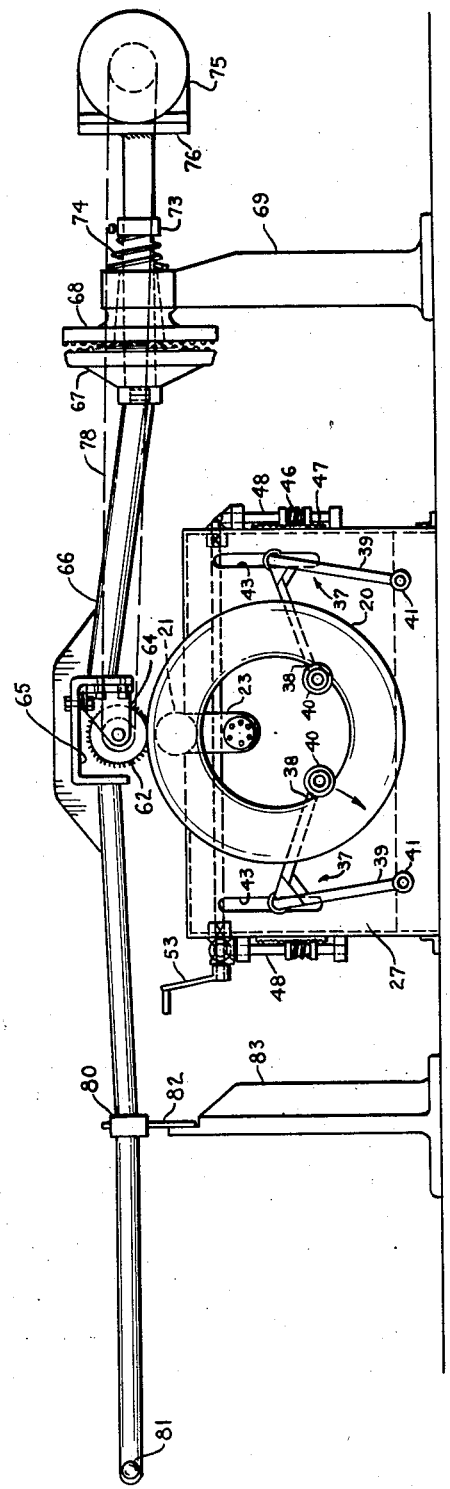

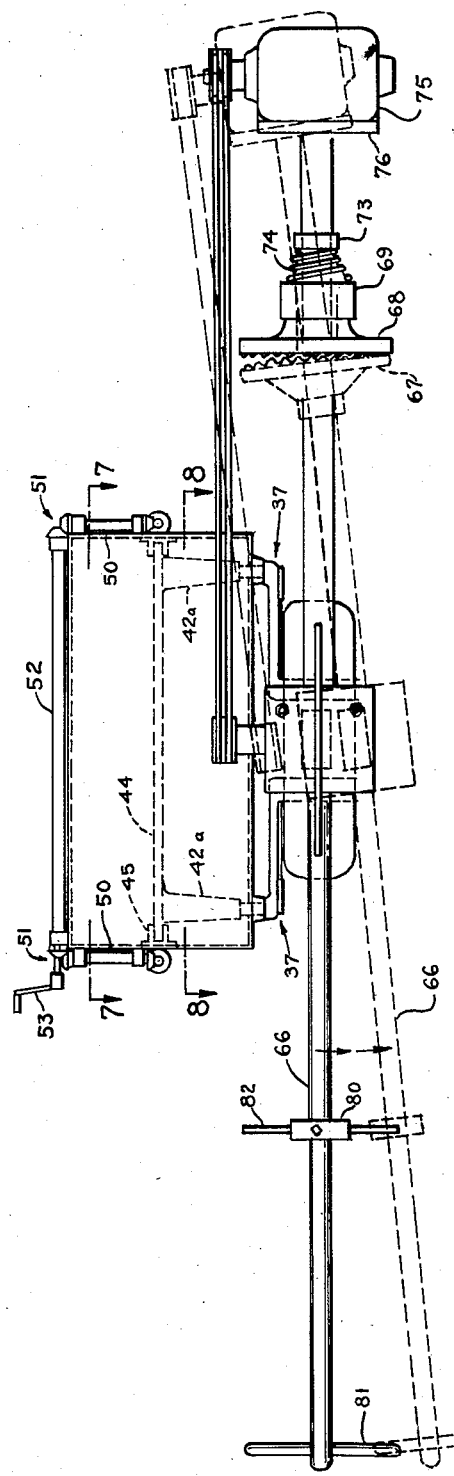

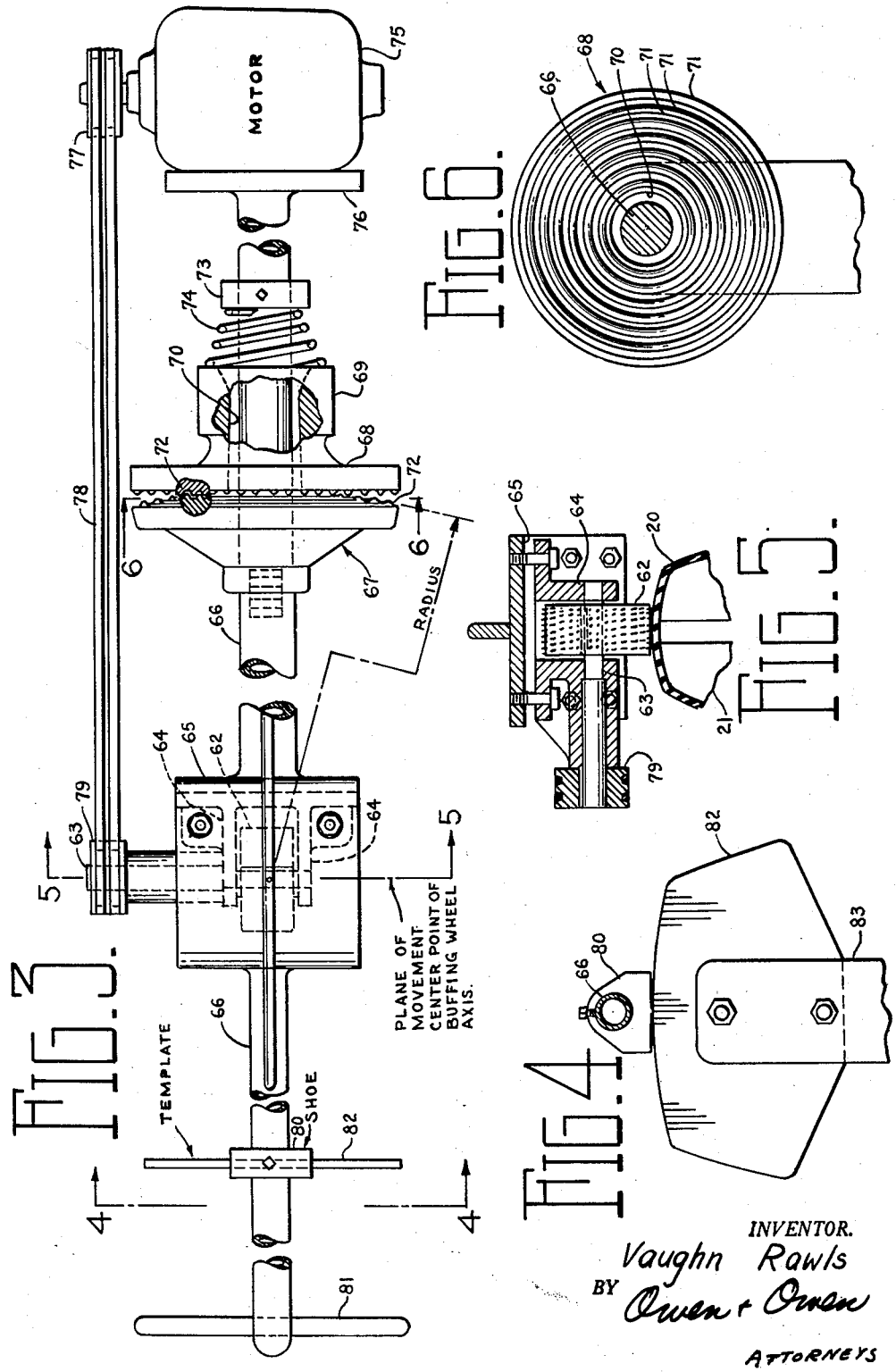

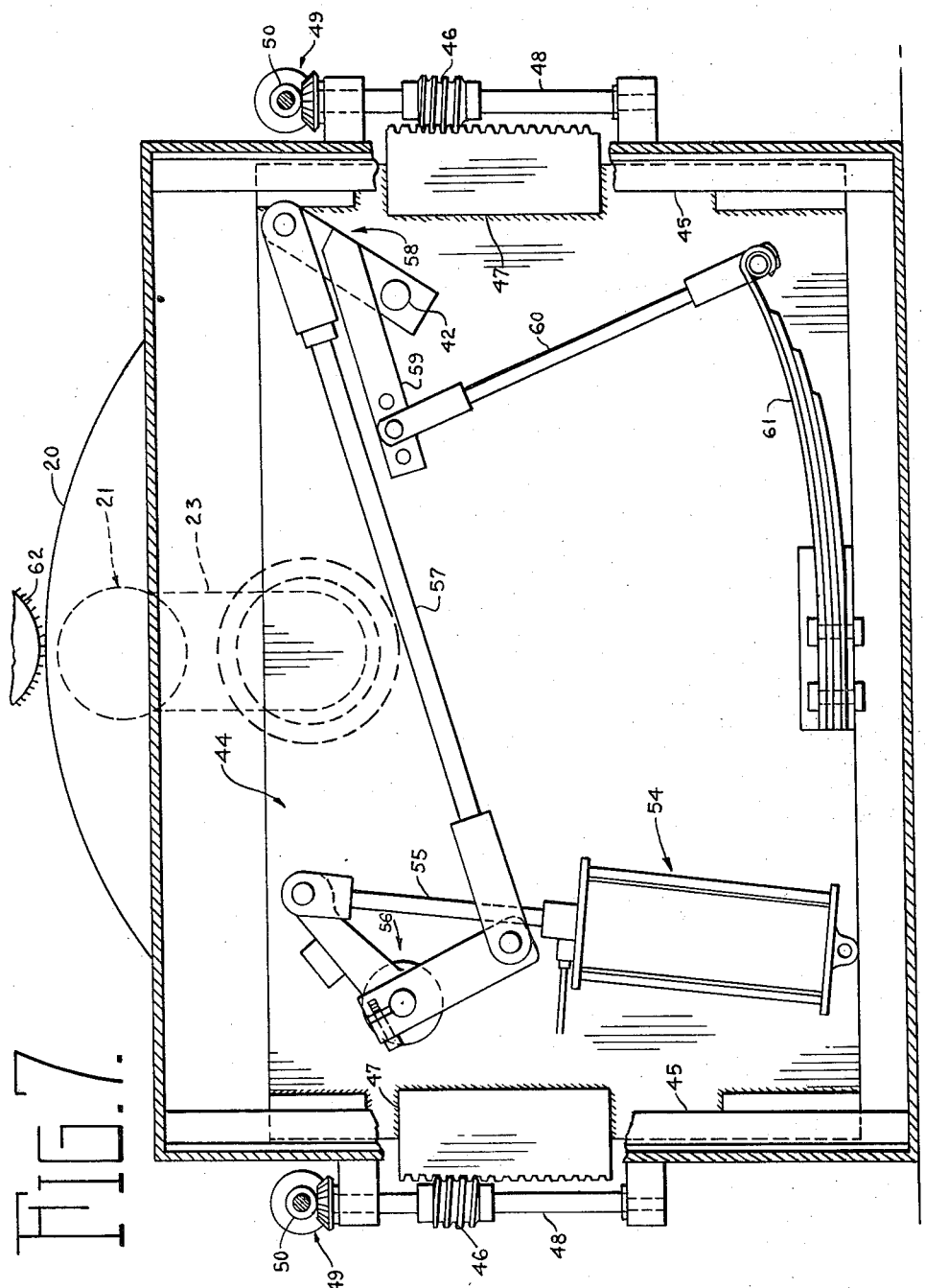

INVENTOR.
Vaughn Rawls
BY Owen+Owen
ATTORNEYS

United States Patent Office 2,852,073
Patented Sept. 16, 1958

2,852,073

METHOD AND APPARATUS FOR BUFFING TIRE CASINGS

Vaughn Rawls, Lima, Ohio, assignor of thirty percent to Robert W. La Warre and ten percent to Wesley O. Lones, Lima, Ohio Application December 15, 1954, Serial No. 475,401

17 Claims. (Cl. 164—10.2)

This invention relates to a method and apparatus for buffing the exterior peripheral surface of a tire casing which is to be retreaded.

Retreading of pneumatic tire casings comprises the steps of removing remaining tread material from the tire casing and reprofiling the tire casing, roughening the surface of the rubber, adhering a strip of "camelback" (new uncured tread material) to the tire casing and vulcanizing the tire and camelback in a mold which adheres the new tread material and shapes it according to a desired tread pattern. This general process of retreading tires is well-known in the art.

The instant invention relates to the step of buffing the tire casing. This step includes roughening the surface so that the camelback will adhere and reshaping the profile of the tire so that the casing itself has the proper profile to be vulcanized to the camelback material to result in a finished retreaded tire of proper size and shape.

In buffing a tire casing the operator must remove unnecessary tread material remaining on the casing, he must make the profile at all cross sections as nearly uniform as possible so that the tire will be balanced laterally, he must leave the tire as close to circular as possible and he must prepare the surface so that the camelback will adhere to it when it is vulcanized in place.

The art has developed a buffing wheel consisting of a body through the periphery of which protrude a multitude of tacks, the points of the tacks serving to grind away the rubber and to cut a multiplicity of disconnected spaced slits in the surface of the casing. Many buffing machines have been developed which provide means for mounting the tire and rotating it on its axis and for moving a rotating buffing wheel into engagement with the surface of the casing. The pressure with which the operator forces the buffing wheel against the surface of the casing compresses the rubber of the casing and makes it difficult for the tack points to penetrate. The heat resulting from this high friction frequently burns the tire casing. In addition, it is almost impossible for the operator to control the movement of the buffing wheel over the surface of the tire with sufficient accuracy to produce a uniform cross sectional profile and tires thus treated are frequently out of balance after they have been buffed.

It is the principal object of this invention to provide a method and apparatus for buffing the surface of a pneumatic tire casing which greatly reduces the force required to draw the buffing wheel points through the rubber and thus reduces the friction and resulting heat to obviate burning the casing.

It is another object of this invention to provide a method and apparatus for buffing a pneumatic tire casing which requires aproximately 50% of the horsepower required to operate conventional buffing wheels, thus resulting in a considerable saving in cost of equipment and expense of operation.

It is a further object of this invention to provide a method and apparatus for buffing the surface of a pneumatic tire casing wherein the profile of the casing can be buffed uniformly by means of a profile template and thus the balance of the tire can be maintained.

A still further object of this invention is to provide a method and apparatus for buffing the surface of a pneumatic tire casing to a controlled profile by so moving the buffing wheel over the surface of the tire that its line of contact with the tire surface at all times lies in a plane extending through the axis of the tire.

A still further object of the invention is to provide a method and apparatus for stretching a localized area of a pneumatic tire casing to be buffed in such manner that the rubber of the casing is prevented from being compressed by the buffing pressure so that the tack points enter the rubber more easily thereby reducing the friction, heat loss and horsepower required to operate.

Yet another object of the invention is to provide apparatus for mounting and rotating a tire casing on its axis with accuracy so that the surface of the casing can be buffed or ground to a constant profile around its periphery.

Other advantages accruing from the method and apparatus embodying the invention will be better understood from the specification and from the drawings, in which:

Fig. 1 is a view in side elevation of apparatus upon which the method of the invention may be performed and, in itself, constituting a portion of the instant invention.

Fig. 2 is a plan view of the apparatus shown in Fig. 1.

Fig. 3 is a fragmentary plan view on an enlarged scale showing details of the apparatus.

Fig. 4 is a vertical sectional view taken substantially from the position indicated by the line 4—4 of Fig. 3.

Fig. 5 is a view similar to Fig. 4 but taken along the line 5—5 of Fig. 3.

Fig. 6 is a view similar to Figs. 4 and 5 but taken along the line 6—6 of Fig. 3.

Fig. 7 is a fragmentary vertical sectional view on an enlarged scale taken along the line 7—7 of Fig. 2.

Figure 8:
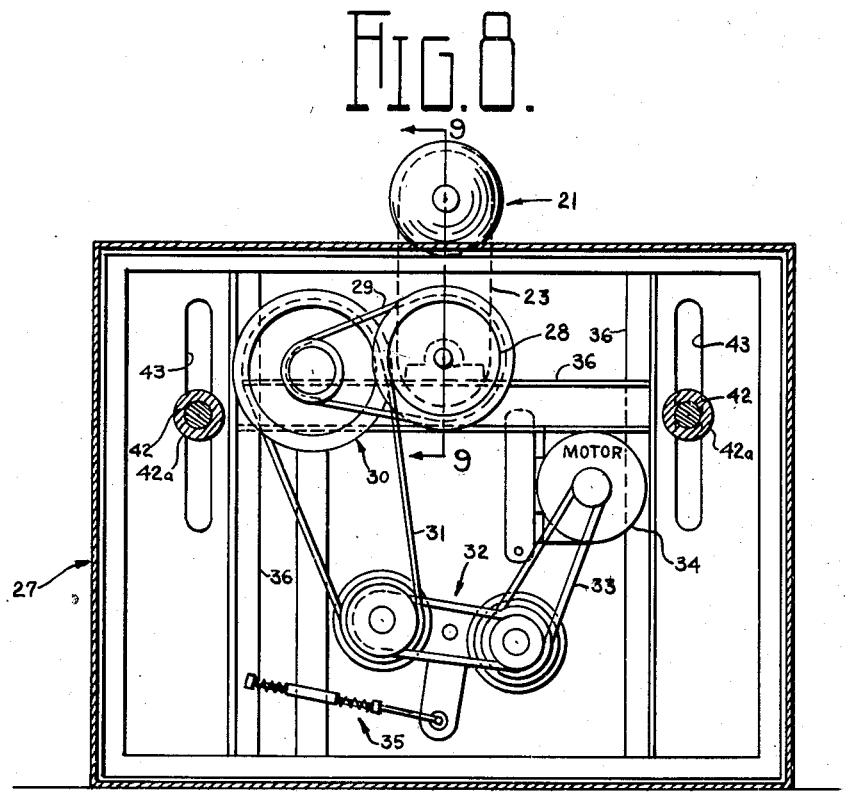
Fig. 8 is a view similar to Fig. 7 on a smaller scale and taken along the line 8—8 of Fig. 2.

Apparatus embodying the invention and upon which the method of the invention can be carried out comprises, among other parts, means for mounting and rotating a pneumatic tire casing generally indicated by the reference number 20. The tire casing 20 is mounted for rotation on its axis upon a support sphere generally indicated at 21 (see Figs. 8 and 9) which comprises two hemispheres 22. The hemispheres 22 are removably mounted on opposite ends of a stub shaft (not shown) which is journalled in the upper end of a vertical strut 23 and driven by a chain 24. The chain 24 also engages a sprocket 25 fixed on the end of a jackshaft 26 that protrudes through the front of a machine housing 27 and has a pulley 28 on its inner end.

Each pair of hemispheres 22 is of appropriate diameter so that it fits the interior of a casing 20 of certain diameter, for example, 6" or 6.5" or other common tire diameter. The hemispheres 22 ride the interior of the tire casing and are rotated by mechanism to be described below in order to produce rotation of the tire casing 20 around its own axis. The axis of the shaft for the hemispheres 22 is parallel to the axis of the tire casing 20 when the casing is mounted in buffing position (Fig. 1) on a machine embodying the invention.

The pulley 28 (Fig. 8) is engaged by a belt 29 in turn engaging one of a pair of co-axial pulleys 30, the other pulley being driven by a belt 31 from the output pulley of a speed change mechanism 32, the input side of which is driven by a belt 33 from a motor 34. By tilting the speed change mechanism 32 through a control linkage generally indicated at 35 an operator may vary its ratio and change the speed of rotation of the hemispheres 22 and thus the speed of rotation of the tire casing 20.

Figure 9:
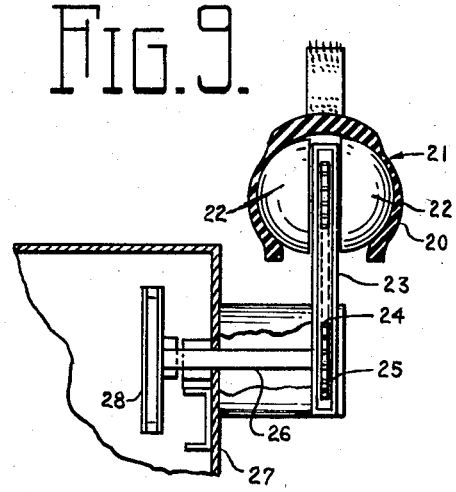
Fig. 9 is a fragmentary vertical sectional view taken along the line 9—9 of Fig. 8.

The sphere 21 on the upper end of the strut 23 is rigidly positioned with respect to the ground by a frame comprising the structural elements indicated by the reference numbers 36 in Fig. 8.

In order to force the tire casing 20 over the sphere 21, to hold it in position on the driving sphere 21, to stretch the material of the casing 20 over the driving sphere 21 and to remove the tire casing 20 off the driving sphere 21 after the buffing operation is finished, apparatus embodying the invention has a pair of double arms generally indicated at 37 in Fig. 1. The two pairs of arms 37 are substantially identical except that one is reversed with respect to the other and each consists of a stretching arm 38 and an angularly spaced lifting arm 39. Each of the stretching arms 38 carries a flanged roller 40 on its end. The roller 40 is so shaped and its flanges are so spaced that it engages the rim beads of the tire casing 20 with the flanged portions of the roller 40 extending exteriorly of the rim beads. The rollers 40 are not driven but are idler rollers. Each of the lifting arms 39 carries a cylindrical roller 41 on its end which is adapted to engage the exterior of the tire casing 20. The axes of all four of the rollers 40 and 41 are parallel to the axis of the driving sphere 21 and thus the axis of the tire casing 20.

Each of the pairs of arms 37 is rigidly fixed on the forward end of one of a pair of rock shafts 42 (Figs. 7 and 8) which protrude through vertical slots 43 in the front of the machine housing 27 and are journalled in sleeve bearings 42a (Fig. 2) welded or otherwise secured to a vertically slidable plate 44 (Fig. 7). The plate 44 is guided for vertical movement in ways 45 which form a part of the structure of the machine housing 27, the ways being fixedly connected to the frame members 36. The plate 44 is moved vertically by the engagement of a pair of worms 46 with a pair of racks 47 one of which is welded or otherwise secured at each side of the plate 44 and protrudes through a suitable opening in the housing 27. The worms 46 are mounted upon vertical shafts 48 which, through pairs of bevel gears 49, are operatively connected to two backwardly extending horizontal shafts 50 (Fig. 2). The two shafts 50, through pairs of bevel gears 51, are operatively connected to a horizontal shaft 52 on one end of which a hand crank 53 is secured. By rotating the hand crank 53 an operator may raise or lower the support plate 44 relative to the housing 27 and thus to the driving sphere 21. This provision for raising and lowering the plate 44 and thus the pairs of arms 37 relative to the driving sphere 21 accommodates tire casings 20 of varying diameters.

The arms 38 and their flanged rollers 40 serve dual functions. When a tire casing is to be mounted over the driving sphere 21 it is lifted upwardly until its rim beads rest on the top of the hemispheres 22. The flanged rollers 40 at this point protrude through the central opening in the casing 20. The operator then activates an air cylinder 54 (Fig. 7) which exerts thrust on its rod 55, swinging a bell crank 56 that is secured on one of the two shafts 42 and, through a link 57, swinging a second bell crank 58 on the other of the shafts 42 so that the two pairs of arms 37 are swung respectively in a clockwise and counterclockwise direction (Fig. 1) by the thrust of the rod 55 downwardly (Fig. 7). Through a crank arm 59 and link rod 60 a spring 61 that is rigidly secured to the plate 44, is flexed as the arms 37 swing downwardly, storing energy to return the arms when the cylinder 54 is vented.

Actuation of the linkage just described swings the two stretching arms 38 and their flanged rollers 40 in the manner described to engage the flanged rollers 40 with the rim bead of the casing 20 to pull it downwardly against the hemispheres 22. The resulting forces wedge the rim beads of the casing 20 apart (axially) and pulls the tire casing 20 downwardly over the driving sphere 21. Continued downward movement of the stretching arms 38 pulls the tire casing 20 downwardly and stretches the area of the tire casing 20 which is in contact with the driving sphere 21. This provides for tight frictional driving contact and it transversely tensions and thereby stretches the surface of the tire casing 20 in a localized area for the purpose to be described below.

After the buffing operation has been completed the operator vents the cylinder 54 and the spring 61, acting through the linkage connecting it to the pairs of arms 37, swings the pairs of arms 37 upwardly until the cylindrical rollers 41 engage the outer surface of the tire casing 20. During this time the operator continues to allow the driving sphere 21 to rotate and thus the tire casing 20 continues to rotate so that as the rollers 41 thrust it upwardly, the rim beads of the casing 20 again are separated, this time by the lower sides of the rotating hemispheres 22 and the tire casing is forced upwardly off the driving sphere 21.

The driving sphere 21 may be changed in size by removing and replacing its two component hemispheres 22 with a pair of hemispheres of different diameter. This accommodates the apparatus to tires having different body diameters. Vertical movement of the plate 44 and the pairs of arms 37 accommodates tires having a different major diameter.

The mechanism described so far constitutes means for mounting and rotating a tire casing on its axis and for stretching a localized area of the surface of the tire casing. By reason of the rotation of the tire casing produced by rotation of the driving sphere 21, the localized area or zone of stretching moves progressively around the perimeter of the tire, i. e., the tire rotates over the stretching and driving hemisphere 21 and that part of it in contact with the hemisphere 21 at any instant is stretched. The utilization of the split driving sphere 21 with its two hemispheres 22 provides two driving lines of contact with the interior of the tire casing 20. These two parallel driving lines, coupled with the flanged rim, bead rollers 40 drive the tire casing 20 so that it does not wobble, i. e., it rotates around its true axis and it is not displaced angularly therefrom during the buffing operation.

The instant invention includes means for buffing the surface of the tire casing 20 over that zone or area thereof which is stretched over the driving sphere 21. These means are illustrated in Figs. 1–6. A buffing wheel 62 (Fig. 5) is mounted on a stub shaft 63 that is journaled by a pair of spaced vertical ears 64 and mounted in a channel 65 (see also Fig. 1) near the center of a generally horizontally extending rod 66. The rod 66 overlies the position of the tire casing 20 when mounted in the apparatus described above. At its rear end the rod 66 mounts a spherical rack 67 which is rigidly secured to the rod 66 and engaged in mesh with a circular rack 68 welded or otherwise rigidly mounted at the upper end of a pedestal 69. The rack 68, which is shown in elevation in Fig. 6, has an axial bore 70 through which the rod 66 extends. Circular teeth 71 of the rack 68 are of such size and are radially spaced such distance, that they mesh with similar teeth 72 on the spherical rack 67.

A collar 73 is fixed on the rod 66 rearwardly of the pedestal 69 and a heavy coil spring 74 extends between the collar 73 and a flat rear face on the pedestal 69, surrounding the rod 66. The expansive force of the spring 74 thrusts the collar 73 and rod 66 backwardly (to the right, Figs. 1–3) maintaining the teeth of the spherical rack 67 and the teeth of the circular rack 68 in mesh with each other. The bore 70 through the circular rack 68 and the upper end of the pedestal 69 is of such diameter and is so shaped as to allow angular movement of the rod 66 to a degree necessary to swing the buffing wheel 62 around over the surface of a tire casing 20 being buffed. This movement is illustrated in Fig. 2 where the rod 66 is shown in solid lines in its median plane position and in broken lines in an angular position. It will be observed in Fig. 2 that the spherical rack 67 rolls on the circular rack 68 to permit the angular movement to take place.

A buffing wheel driving motor 75 is mounted on a motor pad 76 carried by the rear (right) end of the rod 66, and through the medium of a pulley 77 on its shaft and driving belts 78, rotates a pulley 79 secured on the end of the buffing wheel shaft 63. The weight of the motor 75 pivoting on the floating pivot provided by the spherical rack 67 and circular rack 68, counterbalances the weight of the rod 66, the buffing wheel carried thereby and a forward extension of the rod 66 including a template following shoe 80 and a handle 81.

A template 82 (Fig. 4) is removably mounted on the upper end of a pedestal 83 spaced in front of the axis of the buffing wheel 62 a distance equal to the radius of curvature of the spherical rack 67, this distance being indicated by the broken line denominated "Rad." in Fig. 3. Because of this multiplication of leverage, the template 82 is twice the size of the desired tire profile so that when the shoe 80 follows the template 82 the surface of the buffing wheel 62 moves through a path half the size of the template 82 and identical with the desired cross-sectional profile of the casing 20.

In buffing the surface of a tire casing 20 an operator grasps the handle 81 and swings the rod 66, keeping the shoe 80 in contact with the template 82. Because of the engagement of the spherical rack 67 in the circular rack 68, the angular movement of the rod 66 is compensated for by the rocking movement of the spherical rack 67 producing longitudinal translatory movement of the rod 66 proportional to the angle through which the rod 66 is swung in following the template 82. Therefore, while the angle of the axis of the buffing wheel 62 changes relative to the axis of the tire casing 20, its midpoint follows a path determined by the template 82 and lying in a plane of the axis of the tire casing 20. The material of the tire casing 20 is thus buffed off to a constant profile determined by the template 82 and over the stretched zone of the surface engaged by the driving sphere 21. Since the casing 20 rotates on its axis during the buffing operation the profile of the entire casing 20 is rendered uniform and according to the template 82.

Because the area of the surface of the casing 20 which overlies the driving sphere 21 is stretched by the casing 20 being forced downwardly, the rubber on the surface of the casing is easier to cut and it is not compressed by the buffing pressure. This reduces the horsepower required to rotate the buffing wheel 62 and lessens the friction and heat generated thereby. All of these advantages greatly reduce the cost of the operation, improve the results substantially and lessen the time required to prepare a casing for retreading.

I claim:

1. A method for buffing the peripheral surface of an uninflated pneumatic tire casing comprising the steps of placing the exterior surface of said casing in transverse tension in a localized zone and cutting a multiplicity of spaced disconnected slits in the exterior surface of the tensioned portion of the casing.

2. A method for buffing the peripheral surface of an uninflated pneumatic tire casing comprising the steps of placing the exterior surface of the casing in tension in two directions in a localized zone and cutting a multiplicity of spaced disconnected slits in the exterior surface of the tensioned portion of the casing.

3. A method for buffing the peripheral surface of an uninflated pneumatic tire casing comprising the steps of placing a localized area of the exterior surface of the casing in tension, rotating the tire casing on its axis while tensioning such area whereby the localized area under tension is moved over the entire exterior surface of the tire and cutting a multiplicity of spaced disconnected slits in the exterior surface of the tensioned portion of the casing.

4. A method for buffing the peripheral surface of an uninflated pneumatic tire casing comprising the steps of laterally tensioning a small area of the tire casing progressively around the perimeter of the tire casing and simultaneously rotating a buffing wheel against the tensioned area for slitting the surface of such area.

5. A method for buffing the peripheral surface of an uninflated pneumatic tire casing comprising the steps of laterally tensioning a small area of the tire casing progressively around the perimeter of the tire casing and simultaneously grinding off the surface of said casing at the area of tension to a predetermined cross-section and cutting a multiplicity of spaced disconnected slits in the exterior surface of the tensioned portion of the casing.

6. A method for buffing the peripheral surface of a pneumatic tire casing comprising the steps of inserting an object of generally circular cross section into the body of said casing, applying a force on said casing directed radially oppositely away from said object for tensioning a localized exterior area of said casing over said object while rotating said casing on its axis and buffing the exterior surface of said casing at the point radially exteriorly of said object.

7. A method for buffing the peripheral surface of a pneumatic tire casing comprising the steps of inserting an object of generally circular cross section into the body of said casing, engaging the rim bead of the casing with a roller at at least one point remote from the area of engagement of said object with said tire body, translating said roller radially away from said object for tensioning the exterior surface of said casing over said object and rotating said object on an axis parallel to the axis of said object.

8. Apparatus for buffing tire casings comprising means for mounting a casing for rotation on its axis, means for placing a localized area of the peripheral surface of said casing under tension while it is rotating, a buffing wheel and means for mounting said buffing wheel for rotation and for translatory movement along a line lying in the plane of the axis of said casing and in buffing engagement with the exterior surface of the tensioned area of said casing.

9. Apparatus according to claim 8 and template means removably mounted near said casing mounting means and template contacting means on said buffing wheel mounting means, whereby translatory movement of said buffing wheel mounting means according to said template moves said buffing wheel over said carcass for removing material from the tensioned area outside a profile according to said template.

10. Apparatus for buffing the exterior of a tire casing to a desired profile, said apparatus comprising means for mounting and rotating said casing on its axis including a sphere adapted to be inserted into the interior of said casing, means for rotating said sphere on an axis parallel to the axis of said casing, at least one roller engageable with the rim bead of said casing and rotatable on an axis parallel to the axis of said sphere and means for translatably forcing said roller radially away from the axis of said casing for tensioning the exterior surface of said casing over said sphere and buffing wheel mounting and driving means for moving a buffing wheel in engagement with and over the tensioned area of the surface of said casing exteriorly of said sphere.

11. Buffing wheel mounting means for an apparatus for buffing the exterior of a pneumatic tire casing, said means comprising a frame extending generally perpendicularly to the axis of said casing and overlying the surface thereof, a buffing wheel and means for rotatably mounting said wheel on said frame on an axis transverse to said frame and generally parallel to the axis of said casing with said buffing wheel in position to contact the surface of said casing, means at one end of said frame for pivotally mounting said rod for swinging movement of said buffing wheel over the surface of said casing and compensating means included in said mounting means for moving said frame longitudinally a distance proportional to the pivotal movement thereof for restraining the movement of said buffing wheel to a line lying in the plane of the axis of said casing.

12. Means according to claim 11 in which the compensating means comprises a stationary circular rack lying in a plane perpendicular to the line of extent of the frame and a spherical rack mounted on said frame and meshed with said circular rack.

13. Means according to claim 12 in which said frame extends through an axial opening in said circular rack and said spherical rack is mounted on said frame so that the line of extent of said frame is a radius of said spherical rack.

14. Means according to claim 12 in which the buffing wheel is journalled in said frame a distance forwardly of said spherical rack equal to the radius of said spherical rack.

15. Means according to claim 14 in which a template shoe is mounted on said frame at a distance forwardly of said buffing wheel and a profile template that is fixedly mounted in position to be contacted by said shoe for determining the path of movement of said frame and said buffing wheel.

16. Means according to claim 15 in which said template has a profile identical in shape to the desired tire casing profile and proportional in size thereto in a ratio equal to the ratio between the radius of said spherical rack and the distance from said spherical rack to the point of location of said template shoe.

17. Apparatus for buffing the exterior of a tire casing to a desired profile, said apparatus comprising means for mounting and rotating said casing on its axis including a sphere adapted to be inserted into the interior of said casing, means for rotating said sphere on an axis parallel to the axis of said casing, at least one roller engageable with the rim bead of said casing and rotatable on an axis parallel to the axis of said sphere, means for translatably forcing said roller radially away from the axis of said casing for tensioning the exterior surface of said casing over said sphere, a tire profile template, buffing wheel mounting and driving means for moving a buffing wheel in engagement with and over the surface of the tensioned area of said casing exteriorly of said sphere and template following means for controlling the path through which said buffing wheel mounting and driving means moves said buffing wheel.

References Cited in the file of this patent

UNITED STATES PATENTS

| | | |
|---|---|---|
| 1,146,684 | Bauer | July 13, 1915 |
| 1,311,578 | Stilson | July 29, 1919 |
| 1,628,817 | Wilson et al. | May 17, 1927 |
| 1,745,021 | Liebau | Jan. 28, 1930 |
| 2,085,650 | Godfrey | June 29, 1937 |
| 2,160,143 | Hayton | May 30, 1939 |
| 2,162,044 | Wilson | June 13, 1939 |
| 2,321,936 | Pollock | June 15, 1943 |
| 2,450,383 | Risch | Sept. 28, 1948 |
| 2,490,848 | Vossler | Dec. 13, 1949 |
| 2,601,810 | James | July 1, 1952 |
| 2,602,438 | Oliver | July 8, 1952 |
| 2,634,492 | Kent | Apr. 14, 1953 |
| 2,681,499 | Collett | June 22, 1954 |
| 2,717,640 | Schnoebelen | Sept. 13, 1955 |
| 2,725,050 | Jakobsen | Nov. 29, 1955 |